United States Patent Office 2,916,467
Patented Dec. 8, 1959

2,916,467

AMINOPLAST-MODIFIED ALKYD RESIN COATING COMPOSITIONS

Byron L. Williams, Jr., Texas City, Tex., and Harry M. Culbertson, North Wilbraham, Mass., assignors to Monsanto Chemical Company, St. Louis, Mo., a corporation of Delaware No Drawing. Application September 11, 1956
Serial No. 609,077

7 Claims. (Cl. 260—21)

This invention relates to surface coating compositions. More particularly, the invention relates to coating compositions comprising alkyd resins modified with etherified cyclohexylmelamine-aldehyde resins.

Melamine resins have been used to modify the characteristics of alkyd resin coating compositions and have been successful in improving the rate of cure, color retention, and chemical resistance of such compositions. However, the known etherified melamine-formaldehyde resins offer the choice of high cure response with limited alkyd compatibility or lower cure response with wider alkyd compatibility and decreased detergent resistance. The former group, more important commercially, decrease the stability of high acid number alkyds, impair the gloss of alkyd resin coatings, and cause a tendency to brittleness of the modified films.

One object of this invention is to provide new surface coating compositions.

Another object is to provide modified alkyd resin coating compositions.

A further object is to provide coating compositions comprising alkyd resins modified with etherified cyclohexylmelamine-aldehyde resins.

These and other objects are attained by incorporating etherified cyclohexylmelamine-aldhyde resins into alkyd resin coating compositions.

The following examples are given to illustrate the invention. Parts mentioned are parts by weight.

Example I

A reaction vessel is charged with a mixture of 100 parts of cyclohexylmelamine, 194 parts of formalin (37% formaldehyde), 177 parts of butanol, and 103 parts of water. The pH of the mixture is adjusted to 8.5 with 5% aqueous sodium hydroxide, and the mixture is refluxed for 30 minutes at atmospheric pressure. The resulting clear solution is acidified to a pH of 5.8 with oxalic acid and the water removed by azeotropic distillation at atmospheric pressure. The methylol cyclohexylmelamine is etherified and resinified during the process of azeotropic distillation. The solution is then concentrated under a vacuum of about 100 mm. of mercury. The product is a clear, colorless solution of butylated cyclohexylmelamine-formaldehyde resin in butanol. It can be applied to various surfaces to form hard, brittle coatings having a high gloss.

Example II

The butylated cyclohexylmelamine-formaldehyde resin of Example I is used in making a pigmented enamel having the following formulation:

| | Parts |
|---|---|
| Alkyd resin | 20 |
| Resin of Example I | 10 |
| Titanium dioxide | 25 |
| Xylol | 40 |
| Butanol | 5 |

The alkyd resin is a coconut oil-modified glyceryl phthalate resin containing about 33% by weight of fatty acids. The enamel is sprayed onto a steel panel and baked at about 300° F. for 20 minutes. The resulting film has a Sward hardness of 62 and is also characterized by good properties of color retention, gloss, and detergent resistance.

Example III

An enamel is prepared according to the following formulation:

| | Parts |
|---|---|
| Alkyd resin | 15.0 |
| Resin of Example I | 15.0 |
| Rutile titanium dioxide | 15.0 |
| Lampblack | 0.2 |
| Xylol | 50.0 |
| Butanol | 4.8 |

The alkyd resin is a soybean oil-modified glyceryl phthalate resin containing about 41% by weight of fatty acids. The enamel is sprayed onto a steel panel and baked at about 300° F. for 20 minutes to produce a hard film having high gloss and good properties of color retention and detergent resistance.

Example IV

An unpigmented, clear baking varnish is prepared according to the following formula:

| | Parts |
|---|---|
| Alkyd resin | 27.00 |
| Resin of Example I | 3.00 |
| Hydrocarbon solvent | 50.00 |
| Butanol | 5.00 |
| Cobalt naphthenate | 0.06 |

The alkyd resin is a soybean oil-modified glyceryl phthalate resin containing about 62% by weight of fatty acids. The hydrocarbon solvent is a commercial mixture of petroleum aliphatic hydrocarbons. The varnish is sprayed onto a steel panel and baked at about 300° F. for 20 minutes to produce a hard film having high gloss and good properties of color retention and detergent resistance.

The etherified cyclohexylmelamine-aldehyde resins which are used to modify alkyd resins in making the improved compositions of this invention are heat-reaction products of an aldehyde, an alcohol containing 1–6 carbon atoms, and a cyclohexylmelamine compound of the group consisting of monocyclohexylmelamine, dicyclohexylmelamine, and derivatives thereof wherein the cyclohexyl radical bears a substituent of the group consisting of aliphatic and alicyclic hydrocarbon radicals containing 1–6 carbon atoms. These resins may be prepared by reacting the aldehyde and the cyclohexylmelamine under alkaline conditions and then reacting the product with the alcohol under acid conditions. The resins and processes for preparing them are more completely described in our copending application Ser. No. 609,076, filed September 11, 1956. As disclosed in said copending application, the resins contain 3–5 mols of combined aldehyde and at least 3 mols of combined alcohol per mol of cyclohexylmelamine.

The resin of Example I is particularly advantageous for use in modifying alkyds. The preparation of another suitable resin is illustrated in the following example:

Example V

A mixture of 100 parts of cyclohexylmelamine, 83 parts of 91% aqueous paraformaldehyde, 18 parts of water, and 160 parts of methanol is refluxed for 30 minutes at atmospheric pressure at a pH of 8.5 obtained with 5% aqueous sodium hydroxide. The resulting solution is acidified to a pH of 5.5 with oxalic acid and refluxed for 1 hour. Water is removed by a series of flash evaporations in which the wet distillate is replaced by dry methanol until the desired solids content is obtained. The product is a clear, colorless solution of methylated cyclohexylmelamine-formaldehyde resin in methanol.

The etherified cyclohexylmelamine-aldehyde resins have unlimited compatibility with alkyd resins of all oil lengths. Coatings prepared from compositions containing 10–50% by weight of etherified cyclohexylmelamine-aldehyde resin and, correspondingly, 90–50% by weight of alkyd resin are a preferred embodiment of this invention.

The alkyd resins are polyester resins obtained by reacting polyhydric alcohols such as glycols, glycerol, sorbitol, pentaerythritol, etc., with polybasic acids such as phthalic acid, isophthalic acid, maleic acid, adipic acid, azelaic acid, sebacic acid, etc., which resins may be modified with saturated and unsaturated monobasic acids, saturated and unsaturated monohydric alcohols, etc. The oil-modified alkyd resins are polyester resins which have been modified with drying and non-drying oils such as coconut oil, castor oil, soybean oil, linseed oil, tung oil, and the acids and glycerides derived therefrom. The etherified resins are particularly advantageous for use in combination with oil-modified alkyd resins containing 30–70%, and preferably 30–45%, by weight of combined oil acids.

The mixtures of alkyd resin and etherified cyclohexylmelamine-aldehyde resin are soluble in organic solvents such as hydrocarbons, alcohols, ethers, ketones, esters, and mixtures thereof, e.g., xylol-butanol and aliphatic hydrocarbon-butanol mixtures. Conventional pigments and driers such as manganese, lead, and cobalt driers may be incorporated into the compositions. The coating compositions may have a resinous solids content of 20–80%.

Various surfaces such as wood, paper, metal, etc., may be coated with the compositions of this invention. Application of the coatings may be accomplished by conventional methods, e.g., brushing, spraying, roll-coating, tumble-coating, etc. The coatings are cured by heating at temperatures of about 180°–400° F. for about 60–5 minutes.

The coating compositions of this invention are superior in many properties to the alkyd resin coating compositions which are modified with other aminoplast resins. This is illustrated in the following table, which shows the evaluations of four enamels. Enamel 1 is the enamel of Example II. Enamels 2, 3, and 4 are based on the formulation of Example II but have melamine-formaldehyde resin, toluene sulfonamide-modified melamine-formaldehyde resin, and benzoguanamine-formaldehyde resin respectively substituted for the butylated cyclohexylmelamine-formaldhyde resin.

|  | Enamel 1 | Enamel 2 | Enamel 3 | Enamel 4 |
| --- | --- | --- | --- | --- |
| Sward Hardness | 62 | 52 | 48 | 60 |
| Gloss | 93 | 90 | 93 | 93 |
| Color Retention | 15.1 | 13.8 | 13.1 | 14.0 |
| Blistering percent | None | 100 | 100 | 100 |

The gloss was measured by a photovolt glossmeter after baking the enamels for 20 minutes at 300° F. The color retention was evaluated by Color Eye after baking the enamels at 300° F. for 16 hours. The percentage of blistering was determined according to ASTM test D714–45 after immersing the enamels in 0.5% aqueous detergent at 160° F. for 118 hours.

It may be seen from the foregoing that the combination of the cyclohexylmelamine ether resins with alkyd resins gives coatings having a unique combination of advantageous properties including high cure response, high compatibility, excellent stability, high gloss, and outstanding detergent resistance.

It is obvious that many variations may be made in the products and processes set forth above without departing from the spirit and scope of this invention.

What is claimed is:

1. A coating composition having a resinous solids content of 20–80% and comprising an organic solvent solution of a mixture of (A) 50–90% by weight of an oil-modified alkyd resin containing 30–70% by weight of combined fatty acids said oil modifier being a member of the group consisting of coconut oil, castor oil, soybean oil, linseed oil, tung oil, and the glyceride oil fatty acids derived therefrom and (B) correspondingly, 50–10% by weight of a resinous cyclohexylmelamine-aldehyde ether of an alcohol containing 1–6 carbon atoms, said resinous ether containing 3–5 mols of combined aldehyde and at least 3 mols of combined alcohol per mol of cyclohexylmelamine, said cyclohexylmelamine being a member of the group consisting of monocyclohexylmelamine and N,N-dicyclohexylmelamine.

2. A coating composition as in claim 1 wherein the aldehyde is formaldehyde.

3. A coating composition as in claim 1 wherein the alcohol is butanol.

4. A coating composition as in claim 1 wherein the cyclohexylmelamine compound is monocyclohexylmelamine.

5. A coating composition as in claim 1 wherein the aldehyde is formaldehyde, the alcohol is butanol, and the cyclohexylmelamine compound is monocyclohexylmelamine.

6. A coating composition as in claim 5 wherein the organic solvent is a mixture of xylol and butanol.

7. A coating composition as in claim 5 wherein the organic solvent is a mixture of aliphatic hydrocarbons and butanol.

References Cited in the file of this patent

UNITED STATES PATENTS

| Re. 24,351 | Varela et al. | Aug. 27, 1957 |
| 2,574,741 | Hunt et al. | Nov. 13, 1951 |
| 2,619,476 | Malinowske | Nov. 25, 1952 |
| 2,628,234 | Bortnick | Feb. 10, 1953 |